United States Patent [19]

Schwinler

[11] Patent Number: 5,261,179

[45] Date of Patent: Nov. 16, 1993

[54] BIRD REPELLING DEVICE

[76] Inventor: Richard D. Schwinler, P.O. Box 401, Winner, S. Dak. 57580

[21] Appl. No.: 9,031

[22] Filed: Jan. 26, 1993

[51] Int. Cl.$^5$ .......................................... A01M 25/00
[52] U.S. Cl. .......................................... 43/1; 43/131
[58] Field of Search ........................ 43/1, 131, 117; 401/265

[56] References Cited

U.S. PATENT DOCUMENTS

| | | | |
|---|---|---|---|
| 727,454 | 5/1903 | Royce | 43/131 |
| 845,557 | 6/1907 | Townsend | 43/131 |
| 3,146,546 | 9/1964 | Moore | 43/131 |
| 3,147,565 | 9/1964 | Moore | 43/131 |
| 3,906,657 | 9/1975 | Bosch | 43/131 |

FOREIGN PATENT DOCUMENTS

| | | | |
|---|---|---|---|
| 0011525 | 5/1980 | European Pat. Off. | 43/1 |
| 1178636 | 9/1964 | Fed. Rep. of Germany | 43/131 |
| 8203968 | 11/1982 | World Int. Prop. O. | 43/131 |

Primary Examiner—Richard K. Seidel
Assistant Examiner—James R. Miner
Attorney, Agent, or Firm—Leon Gilden

[57] ABSTRACT

A perch tube is orthogonally mounted relative to a mounting plate in an orthogonal relationship, wherein the perch tube includes a grease reservoir directed therethrough. The reservoir is in fluid communication with an exterior surface of the perch tube employing a plurality of rows of outlet ports, wherein each row is displaced at an acute included angle relative to a vertical plane directed through the perch tube. The grease is directed through the outlet ports and directed onto a bird's feet repelling the bird and discouraging further alighting onto the associated perch tube and perch tube area.

4 Claims, 4 Drawing Sheets

FIG 3
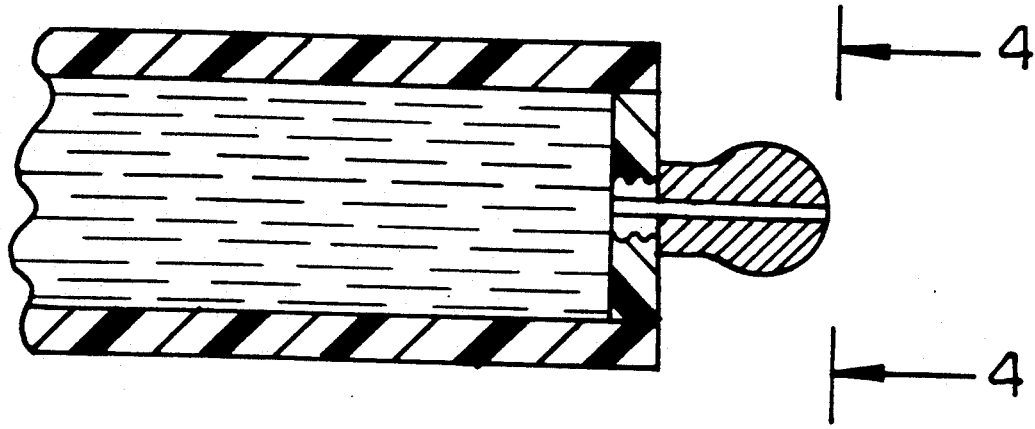
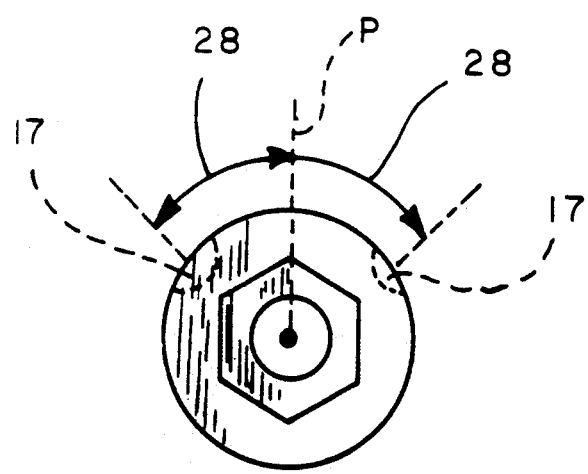
FIG 4

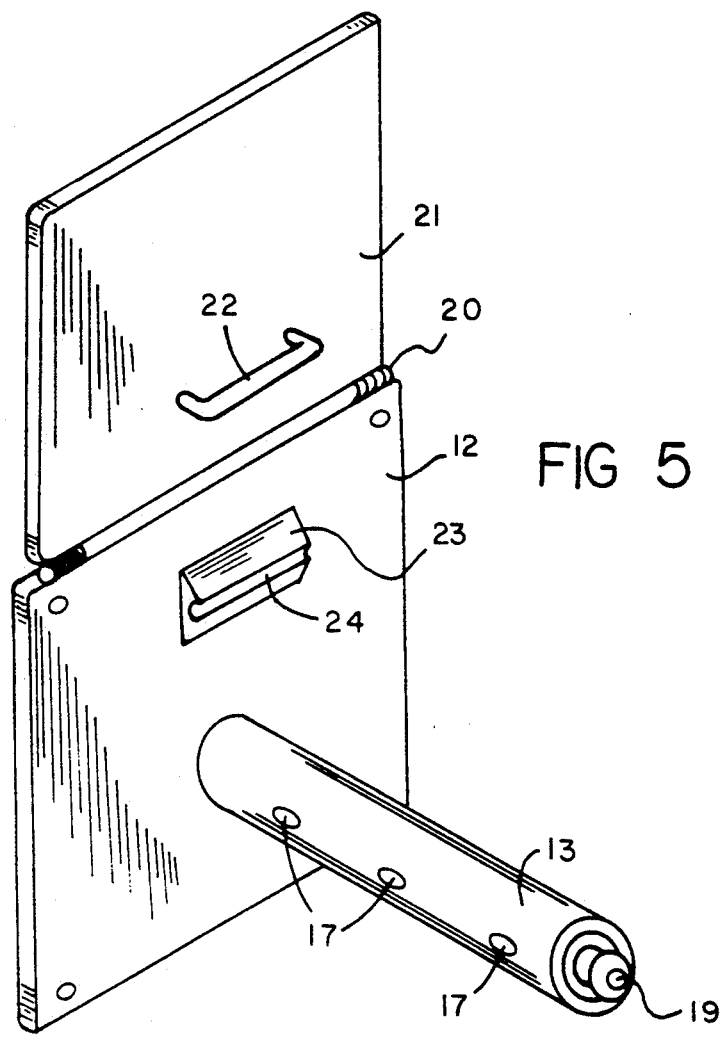
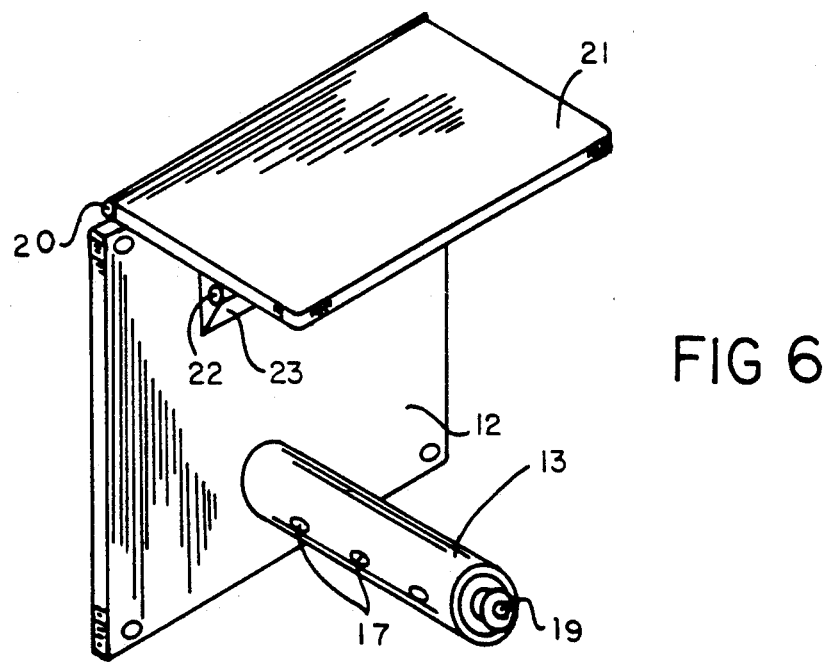

BIRD REPELLING DEVICE

BACKGROUND OF THE INVENTION

1. Field of the Invention

The field of invention relates to repelling apparatus, and more particularly pertains to a new and improved bird repelling device wherein the same is arranged to discourage birds relative to association to an associated area.

2. Description of the Prior Art

Bird repelling apparatus is available in the prior art and exemplified in U.S. Pat. No. 4,656,770 to Nuttle employing audible and visual repelling structure.

The instant invention attempts to overcome deficiencies of the prior art by providing for a bird repelling apparatus arranged to discourage birds relative to alightment in various areas such as agricultural crops, public access areas, and the like, where bird consistent presence may become a nuisance to individuals and in this respect, the present invention substantially fulfills this need.

SUMMARY OF THE INVENTION

In view of the foregoing disadvantages inherent in the known types of bird repelling apparatus now present in the prior art, the present invention provides a bird repelling device providing for a bird perch tube arranged to direct a grease coating about the tube. As such, the general purpose of the present invention, which will be described subsequently in greater detail, is to provide a new and improved bird repelling device which has all the advantages of the prior art bird repelling apparatus and none of the disadvantages.

To attain this, the present invention provides a perch tube orthogonally mounted relative to a mounting plate in an orthogonal relationship, wherein the perch tube includes a grease reservoir directed therethrough, and the reservoir is in fluid communication with an exterior surface of the perch tube employing a plurality of rows of outlet ports, wherein each row is displaced at an acute included angle relative to a vertical plane directed through the perch tube. The grease is directed through the outlet ports and directed onto a bird's feet repelling the bird and discouraging further alighting onto the associated perch tube and perch tube area.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bird repelling device which has all the advantages of the prior art bird repelling apparatus and none of the disadvantages.

It is another object of the present invention to provide a new and improved bird repelling device which may be easily and efficiently manufactured and marketed.

It is a further object of the present invention to provide a new and improved bird repelling device which is of a durable and reliable construction.

An even further object of the present invention is to provide a new and improved bird repelling device which is susceptible of a low cost of manufacture with regard to both materials and labor, and which accordingly is then susceptible of low prices of sale to the consuming public, thereby making such bird repelling devices economically available to the buying public.

Still yet another object of the present invention is to provide a new and improved bird repelling device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 1 in the direction indicated by the arrows.

FIG. 4 is an orthographic view, taken along the lines 4—4 of FIG. 3 in the direction indicated by the arrows.

FIG. 5 is an isometric illustration of the apparatus employing a cover plate.

FIG. 6 is an isometric illustration of the cover plate arranged for use relative to the perch tube.

DESCRIPTION OF THE PREFERRED EMBODIMENT

Figure 1:
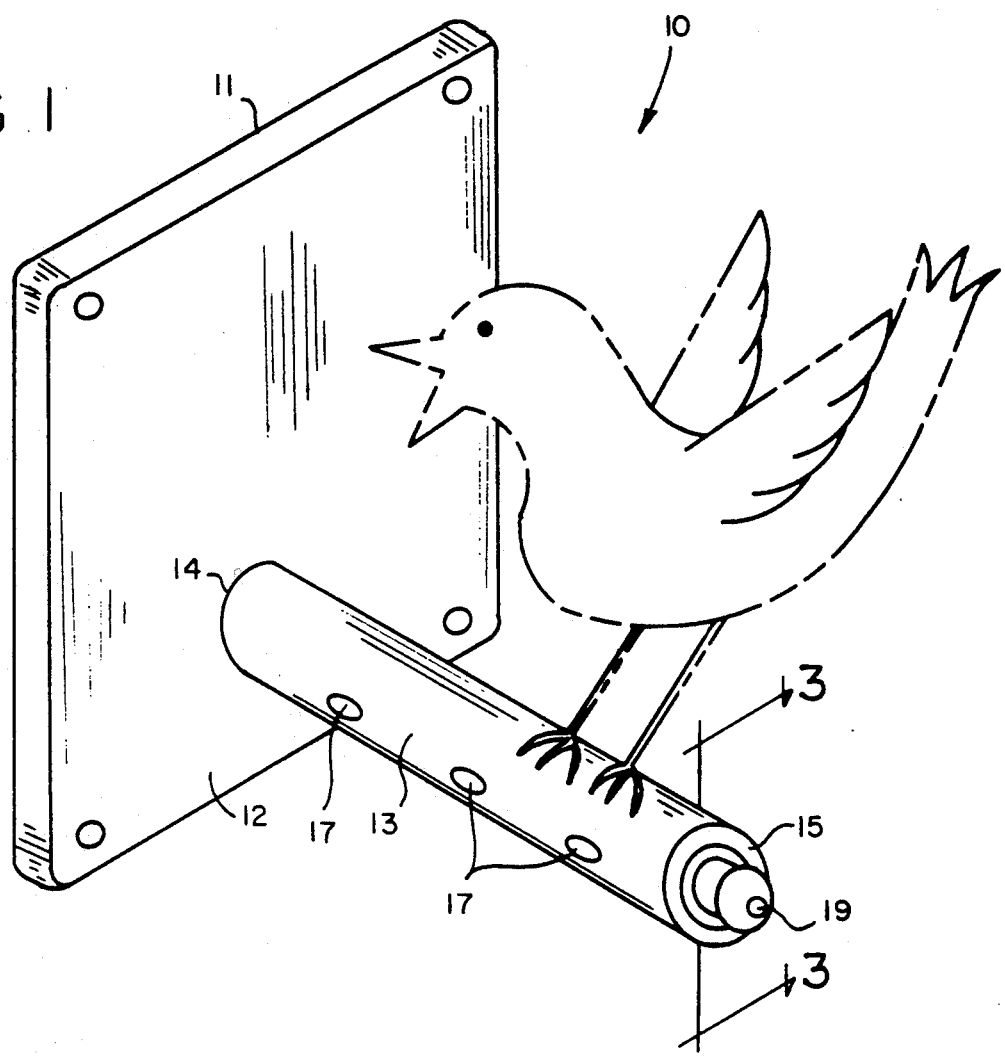
FIG. 1 is an isometric illustration of the invention.
Figure 2:
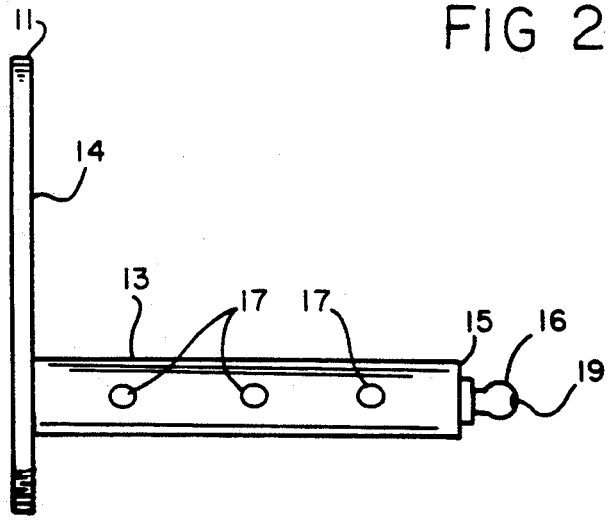
FIG. 2 is an orthographic side view of the invention.

With reference now to the drawings, and in particular to FIGS. 1 to 8 thereof, a new and improved bird repelling device embodying the principles and concepts of the present invention and generally designated by the reference numeral 10 will be described.

More specifically, the bird repelling device 10 of the instant invention essentially comprises a mounting plate 11 arranged for securement to an associated vertical support surface, wherein the mounting plate includes a mounting plate front wall 12. A perch tube 13 is orthogonally and fixedly mounted to the front wall 12 at a first end 14 of the perch tube 13. A second end of the perch tube 15 includes a spherical grease fitting member 16 mounted thereto in fluid communication with the grease reservoir cavity 26 directed coextensively between the first end and the second end 14 and 15 of the perch tube 13. The perch tube 13 is arranged in coaxial alignment between the first and second ends, with a plurality of rows of grease outlet ports 17 directed through the wall of the perch tube. Each row of outlet ports 17 is oriented at an acute included angle 28 (see FIG. 4) relative to a vertical plane "P" orthogonally bisecting the perch tube 13. Typically, the acute angle 28 is thirty degrees. In this manner, an uninterrupted support surface is provided for accommodating a bird alighting upon the perch tube, but orienting the outlet ports 17 in proximity to the uppermost surface of the perch tube for insuring that grease directed through from the outlet port from the reservoir cavity 26 will be directed onto a bird's feet. Accordingly, the reservoir cavity 26 and the grease 27 therewithin is in fluid communication with the outlet ports 17 as indicated. The grease fitting members 16 as illustrated includes a grease fitting inlet port 19 to direct grease into the reservoir cavity 26.

Figure 7:
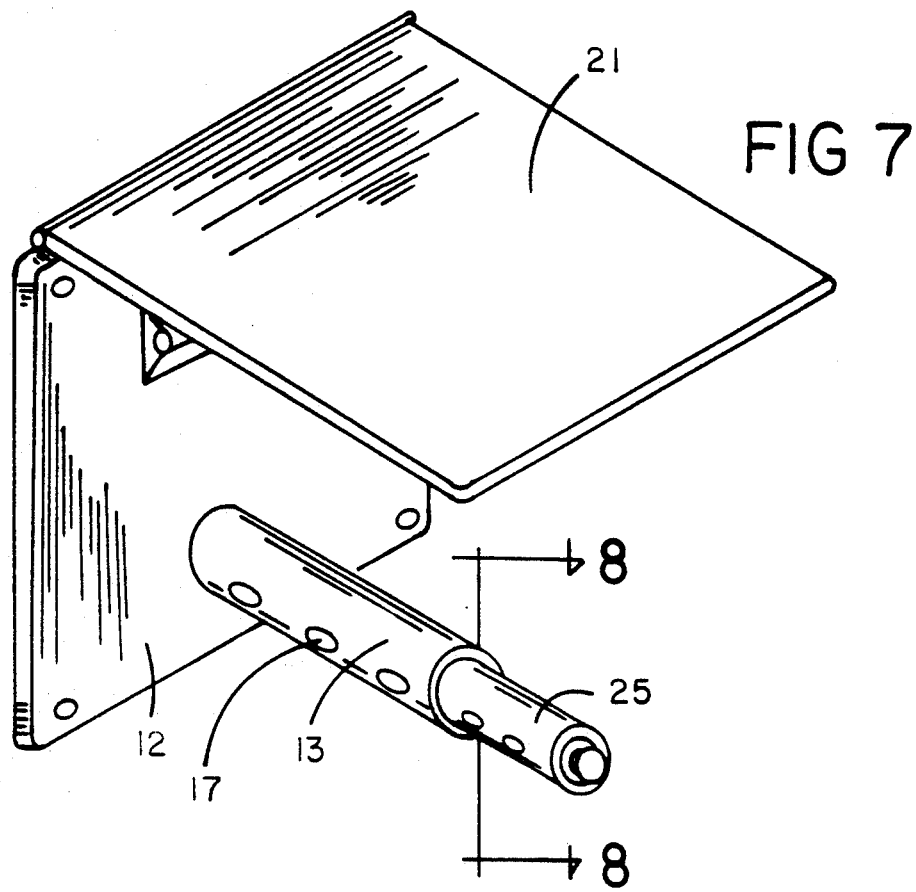
FIG. 7 is an isometric illustration of the invention employing a tube extension.

The FIGS. 5-7 indicates the mounting plate 11 and its uppermost edge having a spring hinge 20 mounted thereto, with the spring hinge having a roof plate 21 arranged for biased coplanar alignment with the mounting plate 11. The roof plate 21 includes a rigid U-shaped latch rod 22 that is arranged for secured reception within a resilient anchor block 23 mounted to the plate front wall 12, with the resilient anchor block having a semi-cylindrical groove 24 arranged to received to receive and secure the U-shaped latch rod 22 when the latch rod is directed therein upon pivoting the latch rod into an overlying relationship relative to the perch tube 13. In this manner, shielding of the perch tube relative to debris, rain, and the like is afforded the perch tube to maintain uncontaminated application of grease about the perch tube in use.

Figure 8:
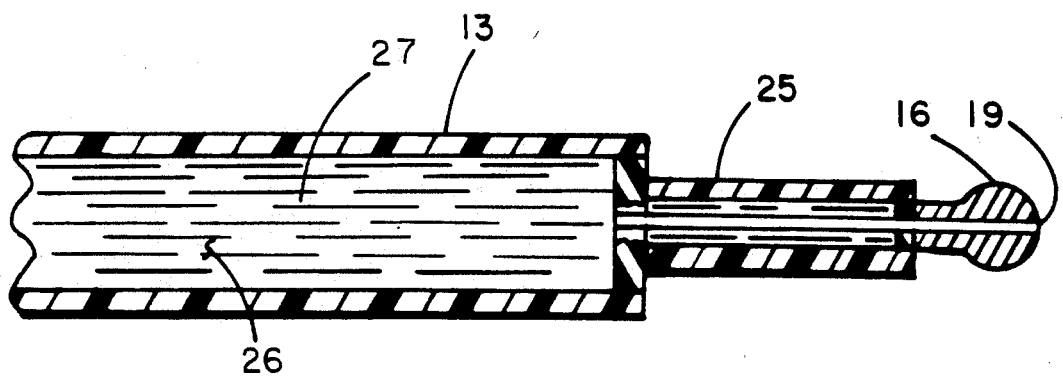
FIG. 8 is an orthographic view, taken along the lines 8—8 of FIG. 7 in the direction indicated by the arrows.

The FIGS. 7 and 8 indicate the use of a grease reservoir extension tube 25 arranged for securement to the second end 15 permitting its extension if desired beyond the roof plate 21. In this manner, the extension tube 25 receives the grease fitting member 16 thereon.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bird repelling device, comprising,
   a mounting plate, the mounting plate having a mounting plate front wall, and
   a perch tube, having a perch tube first end fixedly mounted to the front wall, and a perch tube second end spaced from the front wall, wherein the perch tube is orthogonally oriented relative to the mounting plate front wall, and
   repelling means arranged for directing grease about the perch tube, and
   the repelling means includes a grease reservoir directed within the perch tube extending from the first end to the second end, and a spherical grease fitting member mounted to the second end having an inlet port in fluid communication with the grease reservoir, and grease directed throughout the grease reservoir, and at least one row of outlet ports directed through the perch tube, wherein the perch tube is symmetrically oriented about a vertical plane, and the vertical plane is orthogonally oriented relative to the front wall and the row of outlet ports oriented at an acute included angle relative to the vertical plane.

2. A device as set forth in claim 1 including a further row of outlet ports directed through the perch tube oriented at said acute included angle relative to the vertical plate.

3. A device as set forth in claim 2 wherein the mounting plate includes a mounting plate top edge, and a spring hinge mounted to the top edge, and a roof plate mounted to the spring hinge, wherein the spring hinge maintains the roof plate in a coplanar orientation relative to the mounting plate.

4. A device as set forth in claim 3 wherein the roof plate includes a U-shaped latch rod fixedly mounted to the roof plate, and a resilient anchor block mounted to the front wall above the perch tube, and the resilient anchor block includes a semi-cylindrical groove directed through the anchor block for receiving the U-shaped latch rod to secure the U-shaped latch rod within the anchor block and extend the roof plate over the perch tube.

* * * * *